United States Patent [19]

Schenck, Jr. et al.

[11] Patent Number: 5,953,808
[45] Date of Patent: Sep. 21, 1999

[54] METHOD OF PRODUCING A SEALED SHIELDING UNIT

[75] Inventors: James I. Schenck, Jr., Passumpsic; Scott R. Stein, St. Johnsbury, both of Vt.

[73] Assignee: Lydall, Inc., Manchester, Conn.

[21] Appl. No.: 08/794,978

[22] Filed: Feb. 5, 1997

[51] Int. Cl.[6] .................................................. B21D 39/00
[52] U.S. Cl. ................................................ 29/509; 428/75
[58] Field of Search ..................................... 428/595, 621, 428/75; 29/897.2, 897.32, 509; 181/210, 284

[56] References Cited

U.S. PATENT DOCUMENTS

| | | | |
|---|---|---|---|
| 648,632 | 5/1900 | Parker | 428/75 |
| 3,003,902 | 10/1961 | McDuff | 428/75 |
| 3,540,116 | 11/1970 | Drahos et al. . | |
| 3,543,371 | 12/1970 | Leavens et al. . | |
| 4,441,241 | 4/1984 | Hoeffken | 29/509 |
| 5,001,883 | 3/1991 | Landheer | 52/809 |
| 5,167,060 | 12/1992 | Nawrocki et al. | 29/509 |
| 5,195,580 | 3/1993 | Hoeffken | 29/509 |
| 5,196,253 | 3/1993 | Mueller et al. | 428/75 |
| 5,215,806 | 6/1993 | Bailey | 428/75 |
| 5,590,524 | 1/1997 | Moore, III et al. | 181/240 |

*Primary Examiner*—David P. Bryant
*Attorney, Agent, or Firm*—Griffin, Butler, Whisenhunt & Szipl, LLP

[57] ABSTRACT

The sealed shielding unit comprises a unit made of multiple layers. The layers include a top surface and a bottom surface of a material such as metal, plastic or composite or the like and a middle portion of air or insulation product. The top and bottom layer and insulation are cut into designated shapes and then positioned into the predetermined positions and then pressed into a pan shape with edges having a small upper horizontal end portion. The upper horizontal end portion is folded over and then the edges are bent inward and flattened into a moisture sealed unit. The method of producing a sealed shielding unit comprises the steps of providing the desired material; cutting the desired material; positioning the desired material in pre-determined shapes; pressing the layers of material into a pan design having a horizontal end portion paralleling the base of the pan design; folding the horizontal end portion downward toward the base section of the pan design; forcing the edges of the material inward while holding the top of the edges in position which creates a dovetailed shape; and pressing the edges downward toward the base flattening the unit and creating a moisture sealed unit.

6 Claims, 2 Drawing Sheets

METHOD OF PRODUCING A SEALED SHIELDING UNIT

BACKGROUND OF THE INVENTION

This invention pertains to devices for manufacturing items used for acoustic, thermal or vibration shielding, and in particular, to such a sealed shielding unit and method of producing same to be used in commercial, industrial and private manufacturing in order to provide protection devices for noise, heat and vibration applications.

It is very common to have parts manufactured as shields for automobiles and the like to limit the amount of noise, heat and vibration that will be transferred to the opposite of the shield. However, the current method used to manufacture this type of device requires a long, expensive, labor intensive process and needs to be streamlined in order to become cost effective. The standard process used in this manufacturing procedure is to manually cut the blanks made of aluminum and the insulation; manually place the insulator between the aluminum blanks; scribe marks at intervals around the perimeter of the part; manually bend and fold both pieces of aluminum along one mark toward the rear side of the part; manually tap the folded material flat with a hammer; manually bend and fold both pieces along the inner mark toward the front side of the part; and finally manually tap the folded material flat to create a fold around the perimeter of the unit. What is also needed is a method which will create a sealed shielding unit that is easy to manufacture, environmentally friendly, lightweight and portable with a minimum of manual steps and which will provide an improved sealing unit and have a stronger edge.

It is the object of this invention to teach a sealed shielding unit and method of producing the sealed shielding unit which avoids the disadvantages and limitations, recited above for shielding units and the methods of manufacturing of shielding units.

SUMMARY OF THE INVENTION

Particularly, it is the object of this invention to teach a sealed shielding unit for use in commercial, industrial and private manufacturing in order to provide acoustic, thermal and vibration protection in many applications, comprising a top layer of material; a bottom layer of material; insulation material positioned between said top layer and said bottom layer; said top and said bottom layers of material with said insulation there between comprising a predetermined pan shaped unit; said pan shaped unit having a base portion and a perimeter of perpendicular sides; said perpendicular sides having an elevated horizontal end portion; said elevated horizontal end portion comprising a first seal for said sealed shielding unit when said elevated horizontal end portion is folded downward toward said base portion; and said perpendicular sides comprising a flattened completely sealed perimeter when said perpendicular sides are bent inward and pressed into a sealed flattened piece. It is also the object of this invention to teach a method of producing a sealed shielding unit, for use in commercial, industrial and private manufacturing in order to provide acoustic, thermal and vibration protection in many applications, comprising the steps of providing the desired material; cutting the desired material into pre-determined shapes; positioning the desired material into pre-determined layers; pressing the layers into a pan shaped design having edges with an elevated horizontal end portion paralleling the base of the pan shaped design; folding the elevated horizontal end portion downward; forcing the edges of the material inward creating a form folded over itself; and pressing the edges downward toward the base flattening the unit and creating a moisture sealed unit.

BRIEF DESCRIPTION OF THE INVENTION

Further objects and features of this invention will become more apparent by reference to the following description taken in conjunction with the following figures, in which.

DESCRIPTION OF THE PREFERRED EMBODIMENTS

Figure 1:
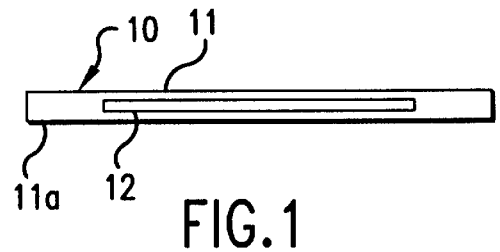
FIG. 1 is a side elevational view of the layers of die cut materials.
Figure 2:
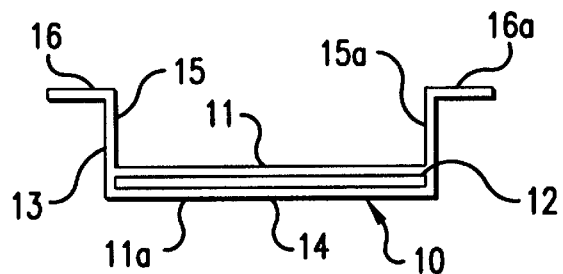
FIG. 2 is a side elevational view of the materials pressed into a pan shaped design.
Figure 3:
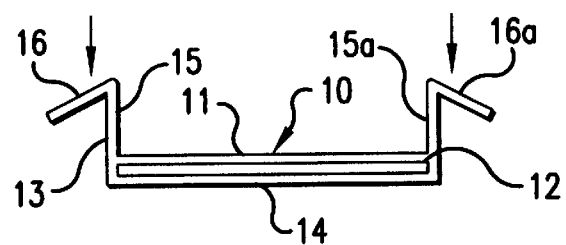
FIG. 3 is a side elevational view of the elevated horizontal ends being folded downward.
Figure 4:
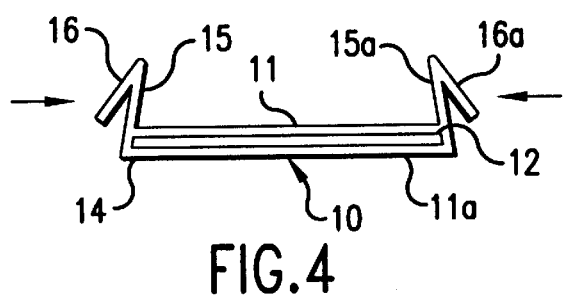
FIG. 4 is a side elevational view of the sides of the pan shaped design being forced inward.
Figure 5:
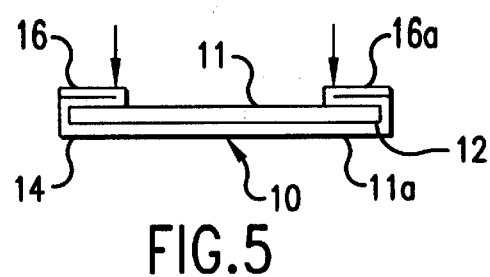
FIG. 5 is a side elevational view of the sides of the unit being flattened into a sealed shielding unit creating a moisture proof barrier around the perimeter of the unit.
Figure 6:
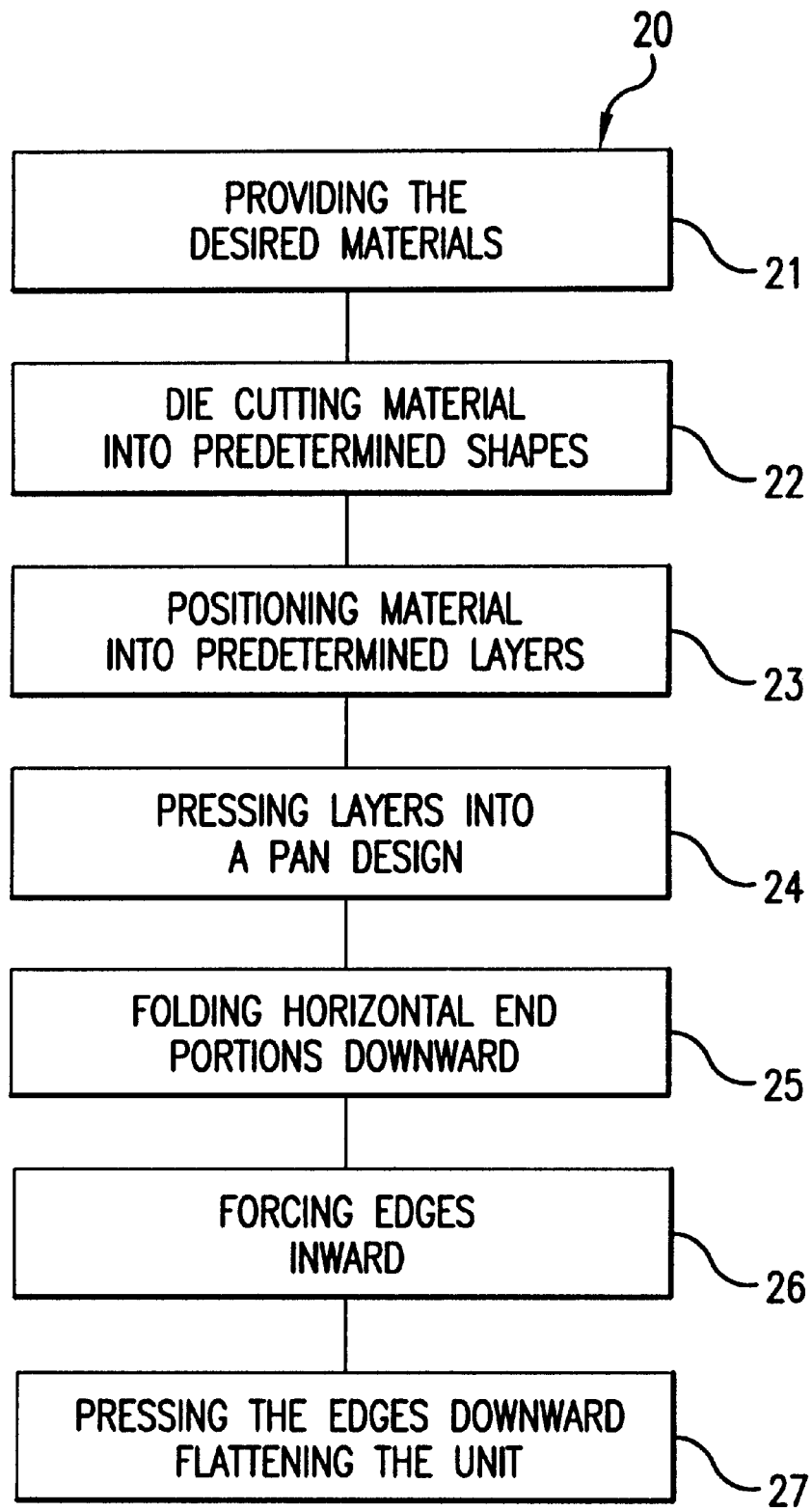
FIG. 6 is a block diagram of the novel method of providing a sealed shielding unit.

As shown in the figures, the novel sealed shielding unit 10 comprises the use of materials in a manner to minimize the amount of manual labor required to complete the product. Two layers of materials 11 and 11a are fed through a die cutting operation with a layer of insulation product 12 that has been cut to size and is then fed between the layers of material 11 and 11a. The material can be constructed of metal, plastic, composite or the like or just an air space can be left between the top and bottom layers. The embodiment shown is using metal. The metal can be of various thickness. The metal pieces 11 and 11a are die cut into pre-determined pieces and then the entire unit is pressed into a pan shaped product 13. The pan shape 13 has a base 14 and a perimeter of vertical sides 15 and 15a that have a small horizontal ends 16 and 16a at the top of the perimeter sides 15 and 15a that are approximately parallel to the base 14. The small horizontal ends 16 and 16a are folded downward toward the base 14 creating an initial primary seal. The sides 15 and 15a are then forced inward which folds the sides over itself. The small, horizontal areas 16 and 16a are then pressed downward which creates a shield with a moisture seal around the perimeter of the unit.

As can be seen by the above description, a number of manual steps have been eliminated by this system. The manual cutting of the metal and insulation are eliminated. Marking of the metal and insulation and the manual bending of the product is eliminated, along with the hammering required to flatten the folds. Additionally, a more uniform product can be achieved by this system. The step of folding the small horizontal area downward toward the base results in a more consistent edge width and height that improves the sealing and creates a fold that is stronger with less waste and eliminates any sharp edges.

The novel method of producing a sealed shielding unit 20 comprises the steps of providing the desired materials 21; die-cutting the desired materials into pre-determined shapes 22; positioning the material into pre-determined layers 23; pressing the layers into a pan design having edges with elevated horizontal end portion approximately paralleling the base of the pan design 24; folding the horizontal end portion downward 25; forcing the edges of the material inward creating a form folded over itself 26; and pressing the edges downward toward the base, flattening the unit and creating a moisture sealed unit 27.

When the operator of the machinery manufactures the insulated shield, he or she simply insures that the metal and insulation feeds are accurately functioning and that the pre-determined die cuts have been correctly pre-programmed. The resulting finished product will have the specific shape the client wishes and will have a product that will have a moisture barrier around the sides of the product in the form folded over itself that required a minimum of hands on labor. At the same time, multiple copies of the product will be very exacting to specifications and will also have a much lower cost per unit than the product that is turned out by hand. The use of the folding over of the small horizontal end portions results in a better, more consistent seal that is much more uniform and is a lot stronger.

Other uses for this method and means can be used. For instance, a variety of products that require multiple layering and a moisture barrier can be manufactures in this manner. The design of the creation of the sealed edges is the key to the simplicity of the manufacture of those products.

While we have described our invention in connection with specific embodiments thereof, it is clearly to be understood that this is done only by way of example and not as a limitation to the scope of our invention as set forth in the objects thereof and in the appended claims.

We claim:

1. A method of producing a sealed shielding unit having acoustical, thermal and vibration protection, comprising:

(1) assembling a top layer (11) and a bottom layer (11*a*) with an insulation material (12) therebetween;

(2) die-cutting the said layers (11, 11*a*) into pieces of predetermined shape;

(3) pressing each of the die-cut pieces with the insulation material (12) therebetween into a pan-shape (13) having a base (14) and a perimeter of substantially vertical sides (15, 15*a*) with substantially horizontal ends (16, 16*a*) at a top of the substantially vertical sides (15, 15*a*);

(4) folding the horizontal ends (16, 16*a*) downwardly toward base (14) so as to create a seal between the folded ends (16, 16*a*);

(5) bending the sides (15, 15*a*) inwardly over themselves; and (6) pressing the bent sides (15, 15*a*) and folded ends (16, 16*a*) downwardly toward one of said pieces into a flattened configuration so as to create a seal between the bent sides (15, 15*a*), and thus form a sealed perimeter of the unit.

2. A method according to claim 1, wherein the top and bottom layers (11, 11*a*) are different thicknesses.

3. A method according to claim 1, wherein the insulation material is air, fiberglass or nomex.

4. The method of claim 3, wherein the insulation material is fiberglass.

5. The method of claim 1, wherein the insulation material (12) is also die-cut.

6. The method of claim 1, wherein the top and bottom layers (11, 11*a*) are metal layers.

* * * * *